Figure 1:
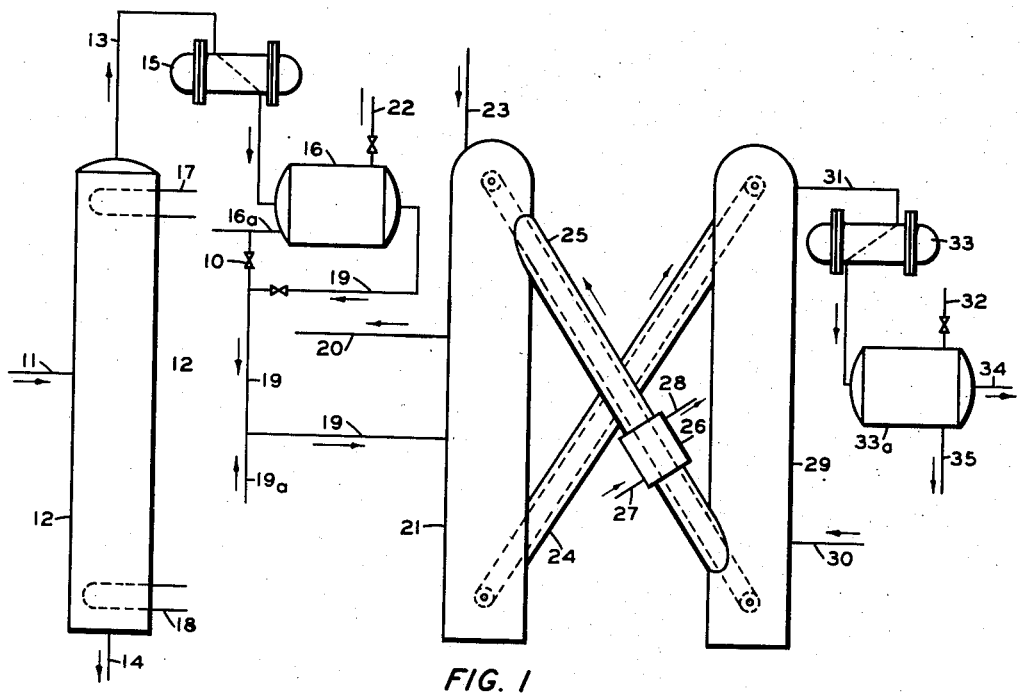

Nov. 23, 1954  M. R. CINES  2,695,321

RECOVERY OF PERFLUORO CARBON COMPOUNDS

Filed Oct. 26, 1951

INVENTOR.
M. R. CINES

BY *Hudson & Young*

ATTORNEYS

United States Patent Office 2,695,321
Patented Nov. 23, 1954

2,695,321

RECOVERY OF PERFLUORO CARBON COMPOUNDS

Martin R. Cines, Knoxville, Tenn., assignor to Phillips Petroleum Company, a corporation of Delaware Application October 26, 1951, Serial No. 253,346

7 Claims. (Cl. 260—653)

This invention relates to the separation of hydrocarbons from perfluoro organic compounds. In one aspect, it relates to a process for the separation of nonacidic completely fluorinated organic compounds from hydrocarbons with the simultaneous recovery of both the hydrocarbons and the fluorine containing compounds.

By the term "perfluoro compounds" I mean completely fluorinated organic compounds. These compounds may be fluorocarbons, that is, compounds containing only fluorine and carbon, or such other nonacidic compounds as ethers, amines, and the like, wherein all of the hydrogen atoms bonded directly to carbon atoms have been replaced by fluorine atoms. Types of perfluoro compounds which may be used in the process of my invention include such nonacidic compounds as perfluoro paraffins, for example, perfluoro normal heptane, perfluorocycloparaffins, as perfluorocyclohexane, and perfluoroalkylcycloparaffins, as perfluoromethylcyclopentane. Examples of perfluoro amino compounds include such compounds as perfluoro-tri-normal-propylamine and perfluoro-tri-n-butylamine. Ether compounds such as perfluoro-di-normal-butyl ether may be listed among the useful compounds for my process.

Mixtures of hydrocarbons and nonacidic perfluoro compounds for separation according to my process may originate from one or more of many sources, as from solvent extraction operations, azeotropic distillation processes and the like. In such processes, mixtures of the perfluoro compounds and hydrocarbons occur, and I have discovered a process for the effective separation of such perfluoro compounds from hydrocarbons. In my separation process, under certain conditions the hydrocarbons and the perfluoro compounds may be separately recovered as pure or relatively pure products, while under other conditions the perfluoro compounds may be recovered as a concentrate. Such a concentrate may usually be treated for recovery of pure perfluoro compounds by my process.

It is known that $C_3F_8$ produced by the electrolytic method has been purified by passage of the crude electrolytic product in vapor phase over silica gel for removal of nonfluorinated and incompletely fluorinated material by adsorption.

An object of my invention is to devise a process for the separation of nonacidic perfluoro organic compounds from admixtures with hydrocarbons.

Another object of my invention is to provide a process for the separation of nonacidic perfluoro organic compounds from admixtures with hydrocarbons wherein the separation is complete and the separated materials are of high degree of purity.

Still another object of my invention is to devise a process for the separation of nonacidic perfluoro organic compounds from admixtures with hydrocarbons, which process is simple and relatively inexpensive to operate.

Yet another object of my invention is to devise a process for the separation of these materials which might result as intermediate products in other operations.

Still other objects and advantages of my process may be realized by those skilled in such art upon reading the following disclosure.

These and other objects may be achieved through my discovery that nonacidic perfluoro organic compounds are not, or are substantially not, adsorbed by such porous adsorbents as metal oxide adsorbents. By metal oxide adsorbents I mean such adsorbents as silica gel, alumina gel, bauxite and natural activated clays.

Figure 2:
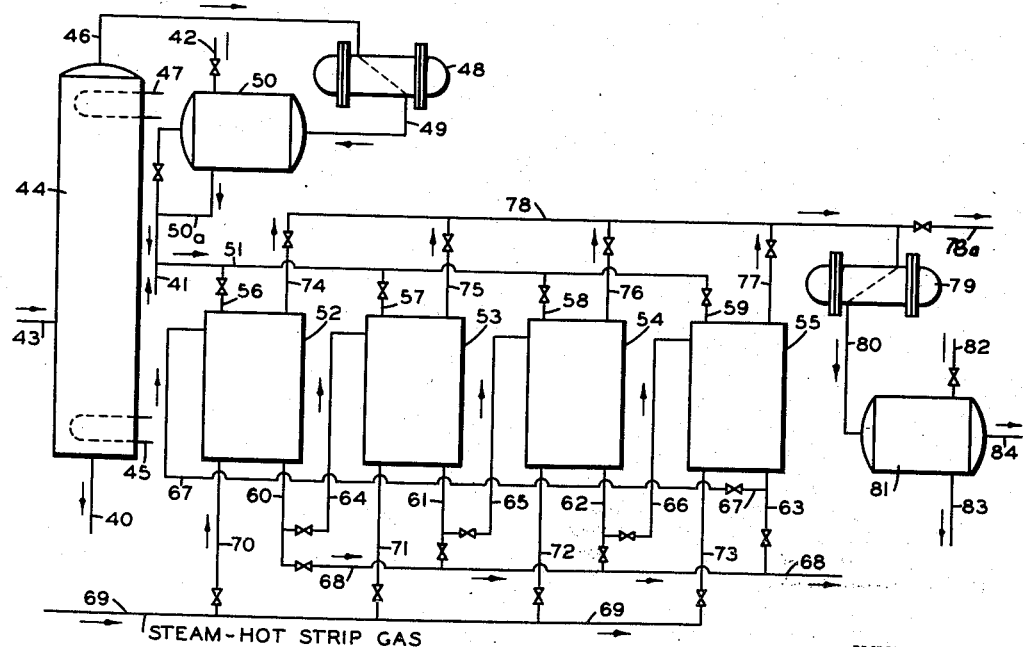

In the drawing Figure 1 represents diagrammatically one form of apparatus in which to carry out the process of my invention. Figure 2 represents another embodiment of apparatus in which the process of my invention may be carried out. I will describe my process for the separation and recovery of a perfluoro compound and one or more hydrocarbons from admixtures containing these materials and originating from any source.

Referring now to the drawing, the main apparatus parts illustrated in Figure 1 are an azeotropic distillation column 12 having an overhead line 13, a bottoms line 14, a side line 11, a reflux coil 17 and a reboiler coil 18. The overhead line 13 is provided with a condenser 15. Condensate from a condenser 15 is intended to flow into an accumulator 16. This accumulator tank 16 is provided with product removal lines 16a, 19 and 22. Reference numeral 21 refers to a continuous adsorption column while numeral 29 refers to a continuous desorption column. An elevator means 24 is provided for transferring of solid adsorbent from the bottom of adsorber 21 to the top of the desorber 29 while an elevator means 25 is provided for elevating adsorbent from the bottom of the desorber 29 to the top of the adsorber 21. Conduit 30 is for introduction of steam or other hot stripping gas into the lower portion of the desorber column. A cooling means 26 is provided for cooling the hot adsorbent while in transit from the desorber to the adsorber. Conduits 27 and 28 are for introduction and removal of cooling medium to the cooler 26. A conduit 23 is for introduction of make-up solid adsorbent.

From the top of the desorption column a line 31 leads by way of a condenser 33 to an accumulator tank 33a. This accumulator is provided with pipe connections 32, 34 and 35.

A pipe connection 19a is attached to pipe 19 as illustrated and another pipe 20 is connected with the adsorber 21 at a point somewhat above the inlet point of pipe 19. A valved line 10 establishes or closes off communication from pipe 16a to pipe 19.

In the embodiment of apparatus illustrated in Figure 2 of the drawing is shown an azeotrope still 44 having an inlet 43, overhead and bottoms withdrawal lines 46 and 40 respectively, and reflux and reboiler coils 47 and 45 respectively. The overhead line 46 leads to a condenser 48 to which is attached a conduit 49 for passage of condensate to an accumulator vessel 50. This accumulator 50 is provided with pipe connections 42, 50a and 51. Line 51 is a manifold line to which pipes 56, 57, 58 and 59 are connected and lead respectively to vessels 52, 53, 54 and 55. These several vessels are provided with overhead lines 74, 75, 76 and 77 and with bottom pipe connections 70 and 60, 71 and 61, 72 and 62, and 73 and 63, respectively. Bottom lines 60, 61, 62 and 63 connect respectively to vessels 53, 54, 55 and 52 with the respective lines 64, 65, 66 and 67. Manifold line 68 connects with lines 60, 61, 62 and 63 while manifold line 69 connects with lines 70, 71, 72 and 73.

A manifold line 78 connects with the overhead pipes 74, 75, 76 and 77, and leads to a condenser 79, thence to pipe 80 and an accumulator tank 81. This accumulator is provided with pipe connections 82, 83 and 84.

In employing the apparatus illustrated in Figure 1 in practicing the process of my invention a feed stock consisting substantially of a hydrocarbon and a nonacidic perfluoro organic compound having a relatively low perfluoro compound content is charged into the azeotropic distillation column 12 through line 11 from a source, not shown. This azeotropic distillation column is operated in such a manner that an azeotrope of the hydrocarbon with the perfluoro compound is distilled overhead through the line 13. The excess of hydrocarbon over that required to form the azeotrope with the entire perfluoro compound content is withdrawn as bottoms from the still 12 through the line 14. Sufficient reboiling heat is supplied by the reboiler coil 18 and sufficient refluxing is furnished by reflux coil 17 to provide proper operation of this column for the separation of the perfluoro compound in the form of the azeotrope.

The vaporous azeotropic mixture is condensed in condenser 15 and the condensate is passed into the accumulator 16. In this accumulator 16 two liquid phases are separated in case the perfluoro compound and the hydrocarbon are not mutually soluble. The upper phase will be largely a hydrocarbon phase but will contain some perfluoro compound in solution while the lower phase will be substantially perfluoro compound but containing some little hydrocarbon in solution. If the amount of hydrocarbon in solution in the lower perfluoro compound layer is sufficiently small this lower layer may be withdrawn through the line 16a as one product of the process. In case this lower perfluoro compound layer contains an appreciable proportion of dissolved hydrocarbon this layer may be withdrawn through line 10 and passed through line 19 as a portion of the charge stock to the adsorption column 21. The upper layer accumulating in the vessel 16 will of course be largely hydrocarbon and this layer will be withdrawn from the accumulator through line 19 and introduced into the adsorption column 21 as the main portion of the charge stock.

In the adsorption column 21 there is maintained a downward moving column of a solid adsorptive material such as silica gel, alumina gel, bauxite or other metal oxide adsorbent, as well as activated clay.

According to my invention I have found that the hydrocarbon content of the feed stock becomes adsorbed on this solid adsorbent in preference to the perfluoro compound. In other words the perfluoro compound is not adsorbed by the solid adsorbent. Thus upon continued introduction of a perfluoro compound-hydrocarbon feed stock into the adsorber 21 there is removed through the line 20 a liquid material which is perfluoro compound substantially free of hydrocarbon. The solid adsorbent with its charge of hydrocarbon is elevated from the bottom of the adsorber 21 by the elevator 24 to the top of the desorption column 29. In this column sufficient steam or other hot inert stripping gas is introduced through line 30 to desorb the adsorbed hydrocarbon and remove same in a vaporous condition through the line 31. By the time the solid adsorbent reaches the lower portion of the desorption column 29 it is intended that the hydrocarbon be completely or substantially completely removed from the solid adsorbent.

From the bottom of the desorption column 29 this hydrocarbon-free solid adsorbent is elevated by the elevator 25 and discharged into the top of the adsorption column to complete the cyclic operation of the solid adsorbent. Since it is known that adsorption takes place more rapidly or efficiently at lower temperatures the cooler 26 is provided for cooling the heated adsorbent as it is being transferred from the desorber to the adsorber. A cooling agent such as water or other suitable coolant is introduced into the cooler through the line 27 and is removed therefrom through line 28. Make up solid adsorbent as required is introduced into the system through line 23 from a source, not shown.

The vaporous hydrocarbon and stripping gas, for example steam, is passed through the line 31 into the condenser 33. Condensate therefrom passes from the condenser on into the accumulator tank 33a. In case steam is used as a desorption medium condensate water is removed from the accumulator through line 35 while hydrocarbon is removed through line 34. In case an inert gas such as for example methane, carbon dioxide or nitrogen is used as a stripping medium, hydrocarbon condensate may be removed through line 35 or through line 34 or both and the stripping gas is removed through line 32. Valved pipes 22 attached to accumulator 16 and 32 attached to accumulator 33a are provided additionally in case pressure relief is necessary from these accumulator vessels.

Referring again to Figure 1 of the drawing, if a mixture of a hydrocarbon and perfluoro compound is desired to be passed directly into the adsorption column 21 it may be passed through the line 19a into line 19 and thence into the adsorber 21 without passing through the azeotrope column 12. If however, it is desired to concentrate this charge material with respect to its perfluoro compound content then the charge material is introduced through line 11 into azeotrope column 12, the operation of which has been hereinbefore explained.

In the operation of the apparatus of Figure 2 the azeotropic column 44 is operated in exactly the same manner as the azeotropic column 12, explained above. The hydrocarbon-rich layer withdrawn from the accumulator 50 is passed via the manifold line 51 into one of the vessels 52, 53, 54 or 55. The composition of the perfluoro compound rich layer in the bottom of accumulator 50 may be similar to that in accumulator 16 and if this product is not sufficiently pure it may be withdrawn from the accumulator and combined with the hydrocarbon-rich layer in line 51 and the two materials passed into one of the afore-mentioned vessels 52, 53, 54 or 55 as a combined charge stock.

These vessels 52, 53, 54 and 55 are fixed bed adsorption vessels charged with such a solid adsorbent material as the above mentioned silica gel. As illustrative of this embodiment of my process I will explain the operation of these vessels when using silica gel as the adsorbent.

It is intended that in the operation of this embodiment of my invention to use three of these adsorption vessels in series while the fourth vessel is undergoing regeneration. For example, if charge stock from manifold line 51 is passed through charge line 56 into vessel 52 then the effluent charge stock from this vessel 52 is withdrawn through line 60 and is passed on through line 64 into vessel 53. From this vessel 53 bottoms material is withdrawn through line 61 and is passed on through line 65 into the adsorption vessel 54. From this latter vessel the bottoms material is withdrawn through line 62 and is passed from the system through line 68 to such disposal as desired. The valve in line 66 is closed so that material from line 62 cannot pass through line 66 into the vessel 55. During the time the vessels 52, 53 and 54 are "on stream" the vessel 55 is being regenerated. For the regeneration operation steam or other hot stripping gas from a source, not shown, is passed through line 69 and through line 73 into the bottom of the vessel 55. When the solid adsorbent with its charge of adsorbed hydrocarbon becomes heated desorption takes place and a mixture of vaporous hydrocarbon and stripping gas flows from the vessel through lines 77 and 78 to the condenser 79. Sufficient cooling is supplied to this condenser to condense the hydrocarbon and steam, in case steam was used, and the condensate is passed through line 80 to the accumulator 81. From this vessel water is withdrawn through line 83 while the recovered hydrocarbon is removed through line 84 for such disposal as desired. Pipe connection 82 is provided for withdrawing uncondensed gas in case an uncondensable stripping gas was used or for pressure relief, if and when necessary. After this desorption operation has been completed an inert cooling gas, as for example, nitrogen, flue gas, methane, etc., may be passed through lines 69 and 73 into the vessel 55 for cooling the solid adsorbent. Such cooling gas may be withdrawn from vessel 55 through lines 77 and 78 and withdrawn from the system through a line 78a. When vessel 55 has become sufficiently cooled the adsorption vessel 52 may be taken off-stream and vessel 55 put on-stream by closing the valve in line 62 and opening the valve in line 66. The valve in line 77 of coure is closed while the valve in line 63 is opened for removal of the unadsorbed perfluoro material. The valve in line 67 of course is closed. For changing the flow of charge stock from vessel 52 to vessel 53 the valve in line 57 is opened and the valve in line 56 is closed, valve in line 64 is also closed. To begin the stripping operation for preparing vessel 52 for reuse the valve in line 73 is closed and the valve in line 70 is opened so that hot stripping gas can be passed from manifold line 69 into the bottom of vessel 52. The valve in line 74 is open for exit of the stripping gas and desorbed hydrocarbon. This vaporous material is passed on through the line 78 to the condenser 79 as described in connection with the regeneration of vessel 55.

When vessel 52 is prepared for reuse the vessel 53 may be taken off-stream and vessel 52 will then become the third vessel of the series through which charge stock is being passed, that is, raw charge stock will be passed into vessel 54, thence through lines 62 and 66 into vessel 55, and thence through lines 63 and 67 into vessel 52. Effluent from vessel 52 then passes through lines 60 and 68 as the perfluoro concentrate product of the process.

If a mixture of a hydrocarbon material and perfluoro compound is obtainable from any source whatever such charge material may be introduced into the system of Figure 2 through the line 41. If it is desired to concentrate the charge material at least to some extent and reject as much hydrocarbon as possible before passage into the adsorption vessels for ultimate recovery then the material should be introduced into the azeotropic distillation column 44 through line 43.

As an illustration of the utility of my invention, I submit the following data of a run for the separation of a hydrocarbon from admixture with a perfluoro compound:

Solid adsorbent......... 100 mesh silica gel.
Charge stock........... 56.1 mol percent perfluoro methylcyclohexane, $d_4^{20}=1.7992$; 43.9 mol percent 2,2,4-tri-methyl-pentane, $d=0.6919$.
Eluent................. Absolute ethyl alcohol.
Net charge............. 73 parts by weight.
First cut taken 5½ hours after charging.
Charge rate............ 6 volumes per hour.

| Cut | Parts by weight | Cum. parts by weight | $d_4^{25}$ | Perfluoro methyl-cyclohexane, mol percent |
|---|---|---|---|---|
| 1 | 9.58 | 9.58 | 1.6599 | 88.0 |
| 2 | 10.04 | 19.62 | 1.4907 | 74.0 |
| 3 | 9.30 | 28.92 | 1.3381 | 58.7 |
| 4 | 8.29 | 37.21 | 1.3000 | 55.5 |
| 5 | 9.62 | 46.83 | 1.2979 | 55.0 |
| 6 | 7.44 | 54.27 | 1.2810 | 54.0 |
| 7 | 8.50 | 62.77 | 1.1608 | 43.0 |
| 8 | 4.68 | 67.45 | (¹) | (¹) |

¹ Not determined.

From this tabulation it will be observed that the first cut which comprised 9.58 parts by weight of the charge stock contained 88 mol per cent of the perfluoro compound, in contrast to the charge stock containing 56.1 mol per cent of the perfluoro compound. In fact the first three cuts each gave an increased concentration of the perfluoro compound indicating that the solid adsorbent entrained the hydrocarbon preferentially to the perfluoro compound.

Pressure and temperature indicating and recording devices, pumps, flow controllers, many additional valves and the like are not shown in the figures for purposes of simplicity. The need for such auxiliary apparatus, and installation thereof, the selection of corrosion resistant apparatus in case corrosion problems are present, are well understood by those skilled in the art.

Since my invention was described as being mainly applicable to the recovery of non-acidic perfluoro compounds, materials of construction of the equipment may be selected from among those commercially available since no special corrosion problems are involved. While I have explained my process as applicable to the separation of perfluoro di-n-butyl ether from a hydrocarbon by use of a continuous process (embodiment of Figure 1) and a semicontinuous or batch process (embodiment of Figure 2) the process is applicable to the separation of other non-acidic perfluoro compounds from any or substantially any hydrocarbons in a liquid phase operation.

While certain embodiments of the invention have been described for illustrative purposes, the invention obviously is not limited thereto.

I claim:

1. A process for separating a mixture, comprising a major proportion of a nonacidic perfluoro organic compound and a minor proportion of a hydrocarbon, into its components and recovering said nonacidic perfluoro organic compound as such as one of the products of the process, comprising treating said mixture with a porous adsorbent under liquid phase adsorption conditions, from this treating operation with said adsorbent removing said nonacidic perfluoro organic compound as the unadsorbed and main product of the process and recovering said hydrocarbon from the adsorbent as a second product of the process.

2. The process of claim 1 wherein the adsorbent is an adsorbent metal oxide.

3. The process of claim 2 wherein the adsorbent metal oxide is alumina gel.

4. The process of claim 2 wherein the adsorbent metal oxide is silica gel.

5. The process of claim 2 wherein the adsorbent metal oxide is bauxite.

6. The process of claim 2 wherein the adsorbent metal oxide is activated natural clay.

7. The process of claim 2 wherein the nonacidic perfluoro organic compound is perfluoro-methyl cyclohexane.

References Cited in the file of this patent

UNITED STATES PATENTS

| Number | Name | Date |
|---|---|---|
| 2,341,567 | Moriarty | Feb. 15, 1944 |
| 2,371,341 | Matuszak | Mar. 13, 1945 |
| 2,459,434 | Kanhofer | Jan. 18, 1949 |
| 2,463,077 | Zimmerman et al. | Mar. 1, 1949 |